United States Patent Office 3,209,323
Patented Sept. 28, 1965

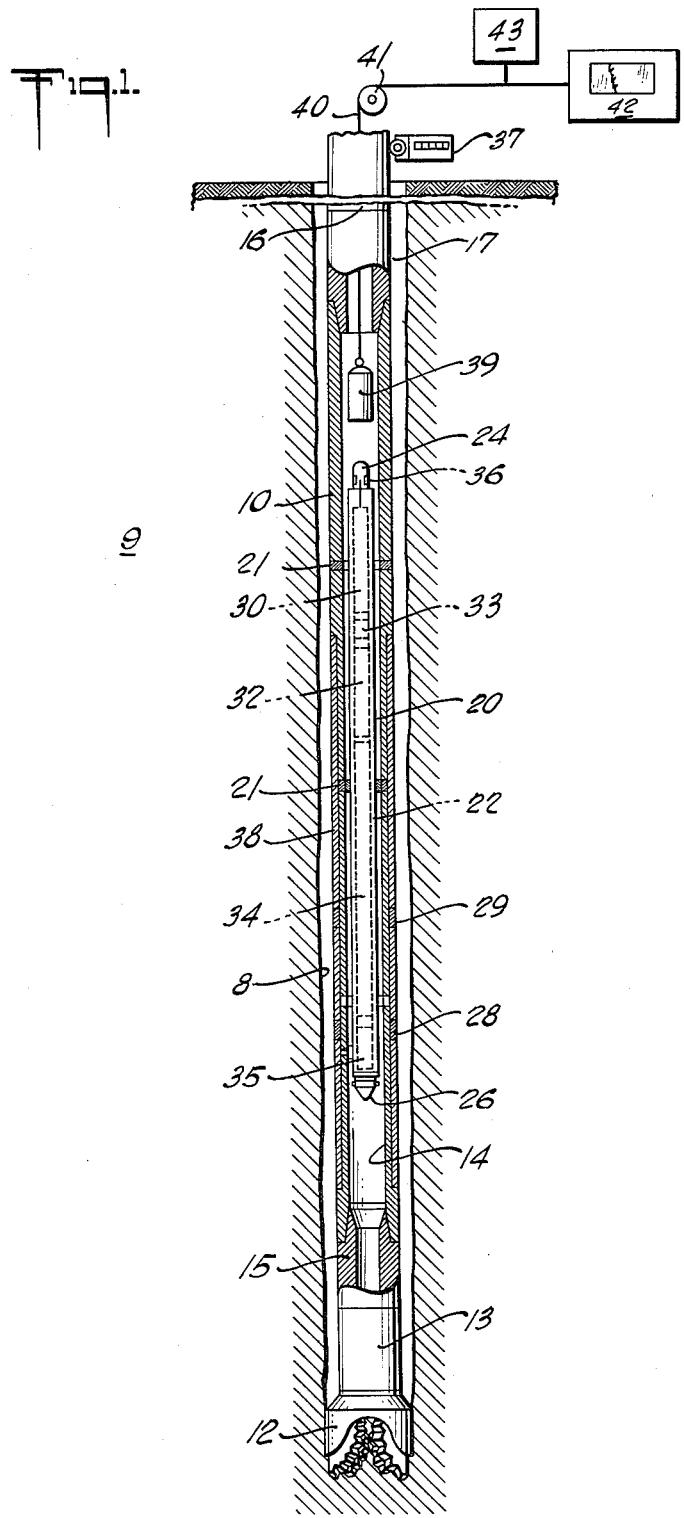

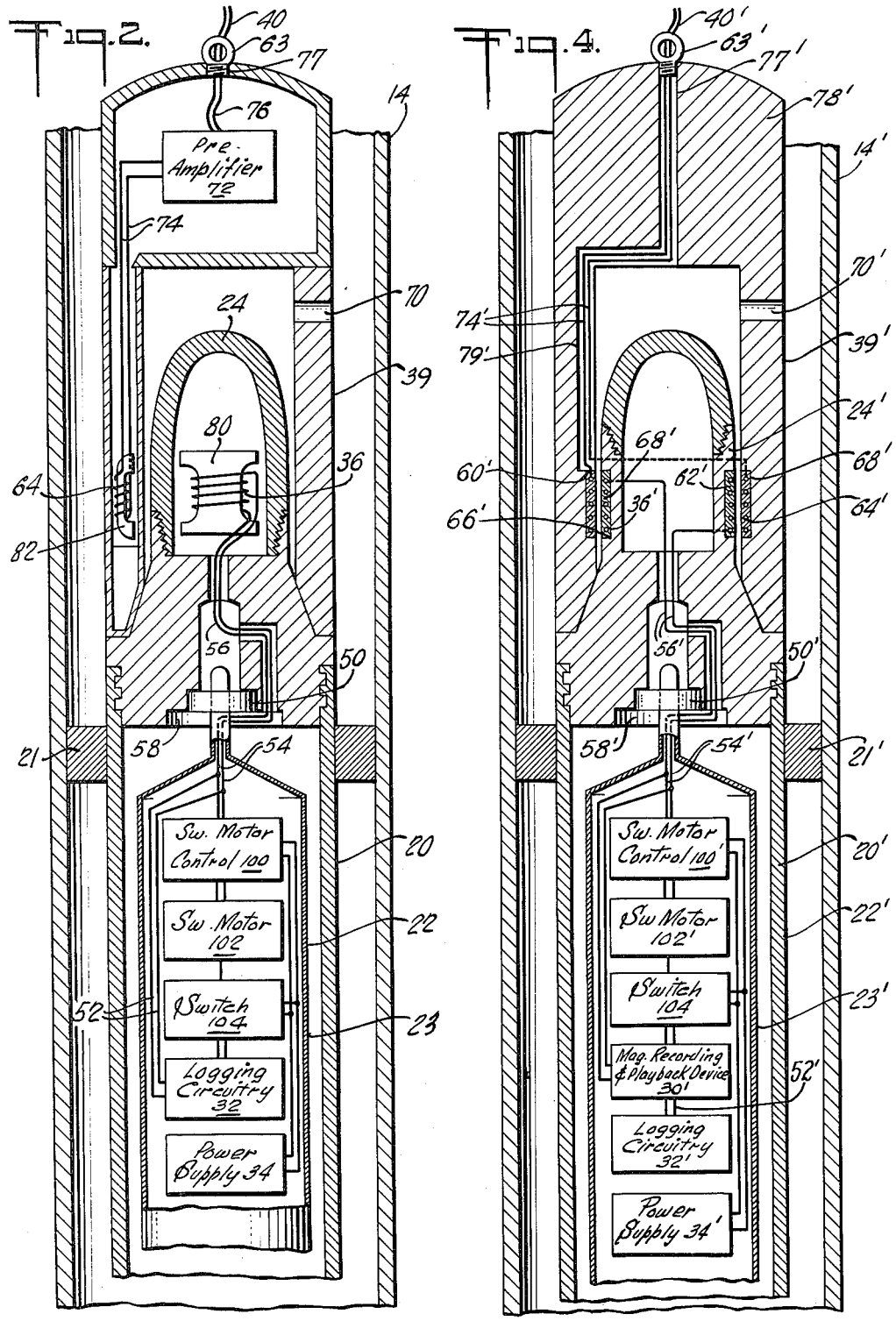

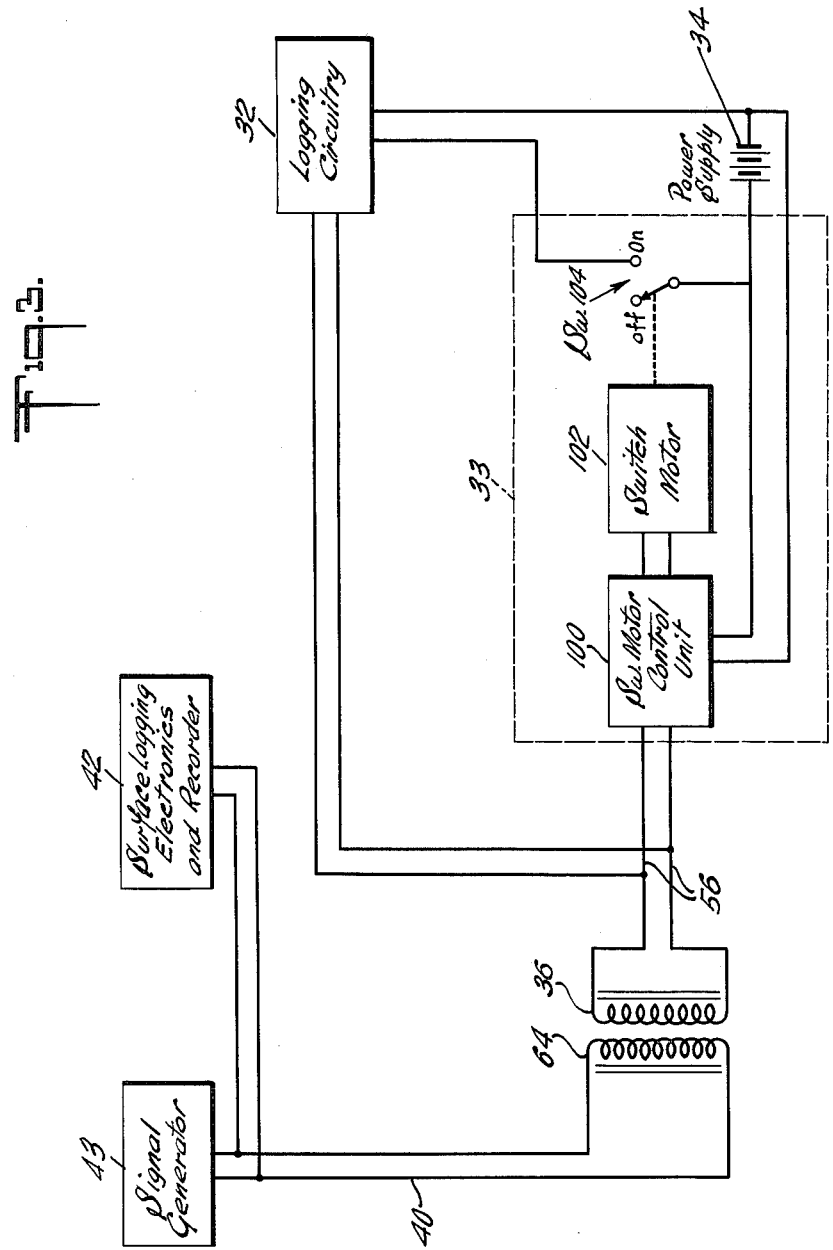

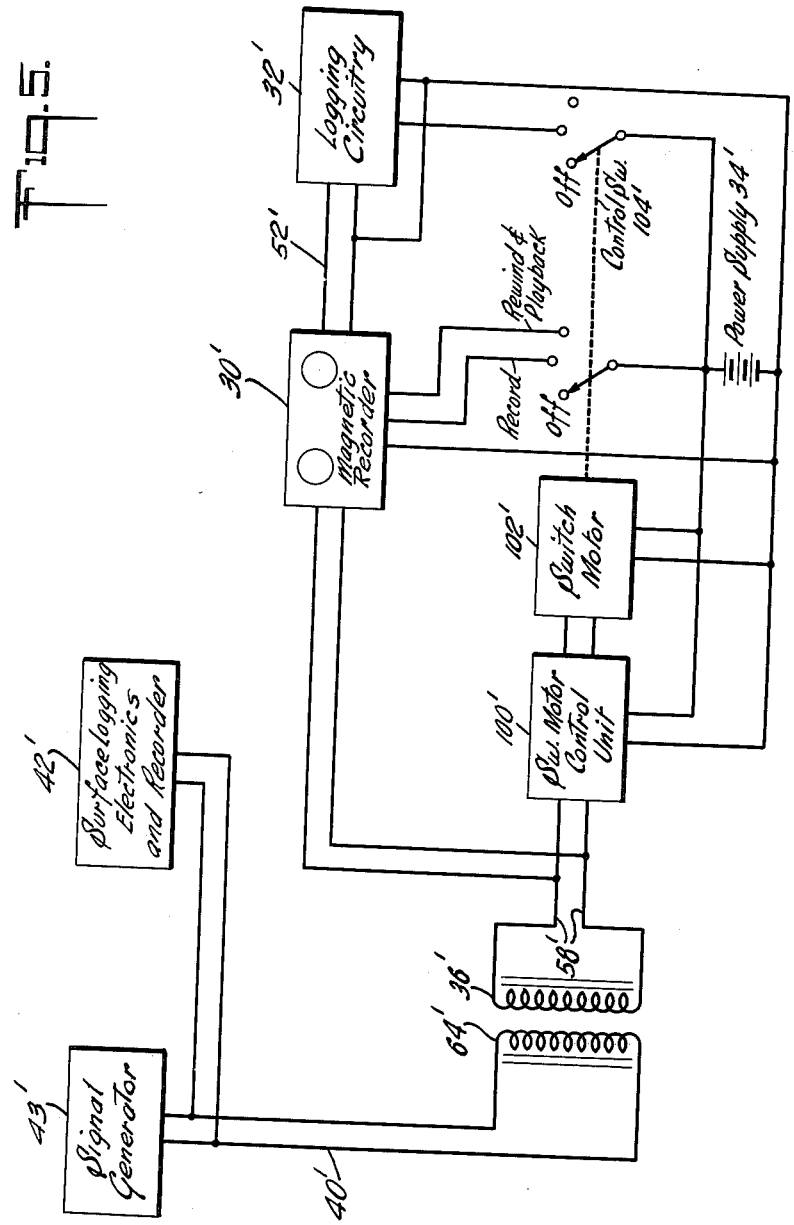

3,209,323
INFORMATION RETRIEVAL SYSTEM FOR
LOGGING WHILE DRILLING
George J. Grossman, Jr., Houston, Tex., assignor to Texaco Inc., New York, N.Y., a corporation of Delaware
Filed Oct. 2, 1962, Ser. No. 227,863
8 Claims. (Cl. 340—18)

This invention relates to a method and apparatus for geophysical prospecting and, more particularly, to a method and apparatus for simultaneously drilling and logging a bore hole.

More specifically, the invention concerns a method and apparatus for transmission of logging information from the bottom of a well bore to the surface of the earth.

In the conventional method of logging a bore hole the log is obtained while the drilling operation is interrupted, during which time the drill pipe is removed and a logging instrument suspended by a steel-shrouded conductor electrical cable is lowered into the bore hole. As the instrument penetrates different geological strata, information in the form of electrical signals is transmitted from the bottom of the bore hole to the surface of the earth through the conductor cable where it is recorded on a chart.

There are several disadvantages in using the conventional logging method. An important disadvantage is that the drilling rig must be idle while the logging crew takes over the well bore. Furthermore, during the drilling operation the drilling fluid in the bore hole invades the formation around the bore hole changing the electrical characteristic of the formation. Invasion is progressive with time and may sufficiently contaminate the formation to confuse the interpretation of logs obtained at a considerable time after the mud begins to invade the formation. Depth control to a certain formation is difficult in that the desired strata may have been drilled through before a log is run.

It has been found that many of these disadvantages may be eliminated or mitigated by simultaneously logging and drilling. In an effort to achieve the objective of logging while drilling, several methods have been used or proposed heretofore. One of the first methods of logging while drilling was to observe the cuttings in the drilling mud as they came to the surface. However, this method has proven to be subject to considerable error since the cuttings of the various formations become intermixed and are greatly diluted by the mud which carries them to the surface where they are examined.

Another method of logging while drilling attempts to overcome the important problem of transmission of information to the surface by utilizing a specially fabricated drill pipe having two insulated electrical conductors through each joint which are terminated in spring loaded pin and socket connections. When the drill string is made up, these connections are engaged and thereby effect a two-wire-line transmission system between the subsurface and surface equipment. This transmission system has been found to be impractical due to the time required to make the electrical connections at each pipe joint and to the lack of electrical and mechanical reliability and durability thereof.

Another logging while drilling system utilizes electromagnetic couplings between joints. This system consists of a large number of transformers in cascade to effect communication between the surface and subsurface equipment. The physical installation requires the placement of a coil of wire at each end of each joint of the drill pipe. The coils are connected together by a two-wire cable within each length of drill pipe. When the drill string is made up pairs of coils come into proximity providing electromagnetic coupling between joints. Due to the loss of energy at each coupling, this type of transmission system should include a number of booster or repeater stations. A frequent replacement of energy sources at these booster stations ascribes to this method of signal transmission disadvantages that are associated with making direct manual connections at each joint. A system which utilizes electromagnetic couplings is disclosed in U.S. Patent 2,379,800 granted to D. G. C. Hare on July 13, 1945.

Still another method of logging while drilling employs an electrical transmission system from the subsurface to the surface equipment which utilizes the steel drill pipe as one conductor and a second conductor is provided by installing an insulated conductor in the center portion of the drill pipe. The means of coupling the second conductor from the bottom of one joint to the top of the next involves the fitting of a probe into a cup or vial of mercury. A disadvantage of this method, however, lies in the fact that the center of the pipe is no longer available for special purpose equipment as is often used in the process of drilling and therefore this arrangement is also considered impractical.

In still another method of logging while drilling the disadvantages encountered in providing a practical transmission path for the logging signal from the subsurface to the surface equipment are avoided by utilizing a completely self-contained logging unit mounted in the drill collar immediately above the drill bit. Logging intelligence is recorded on either photographic film or magnetic tape which is removed from the instrument housing when the drill collar is returned to the surface, as for replacement of the drill bit, which operation is ordinarily conducted about once every twenty four hours. The film or tape is then translated as a function of depth to provide a strip chart log of the bore hole. A disadvantage of this method lies in the fact that the logging information is not available to the operator until some time has elapsed, which may be as much as a full day after a zone of interest has been penetrated by the drill bit. A system of this type is disclosed in copending application Serial No. 677,969 filed in the names of Roy J. Clements, Burton D. Lee and Roland B. Stelzer, now Patent No. 3,149,683.

An object of this invention is to provide an improved system for logging while drilling.

Another object is to provide a system for transmitting logging intelligence from the bottom of a well bore to the surface of the earth while drilling operations are in progress.

Still another object of this invention is to provide a system for storing logging information in subsurface apparatus in a well bore and retrieving such stored information at will while the drill string is in the well bore.

In order to overcome the disadvantages encountered in the prior art, a method of geophysical prospecting in accordance with the present invention is provided which comprises drilling a bore hole, simultaneously detecting a physical variable or parameter in the hole by means of logging instrumentation located in the vicinity of the drill bit, continuously recording the depth in the bore hole at which the physical variable is being detected, lowering an "overshot" device into close proximity to the logging instrumentation in the bore hole, receiving logging intelligence from the logging instrumentation in the form of an electrical signal with the overshot device, and transmitting this intelligence to recording equipment located at the surface of the earth where the logging intelligence is recorded as a function of depth of the instrumentation in the hole to provide a log of the bore hole.

The method of the present invention may be carried out with novel apparatus for logging a subsurface physical variable or parameter while drilling a bore hole through the earth's formations which comprises a tubular member or housing adapted to be inserted in a conventional drill stem or string, a sealed container or pressure type capsule disposed within and secured to the housing and adapted and arranged to permit the passage of fluid through the housing, means disposed at least in part within the capsule for detecting values of the parameter being measured, including means for passing an electrical signal descriptive of the logging intelligence through an electromagnetic circuit, a signal sensing and transmission device containing an electromagnetic signal receiving inductor adapted to be lowered into the bore hole through the drill string on a conductor cable to a position immediately adjacent the electromagnetic transmitting circuit associated with the detection means. Additional means is located at the surface of the earth for receiving and recording signals passed over the conductor cable to produce a graphic record or log of the bore hole.

A modification of the present invention contemplates that information concerning a physical variable in the bore hole is recorded or stored in the subsurface apparatus during the period when drilling is progressing, and the recorded information is transmitted to the surface intermittently. This modification includes the additional steps of magnetically recording information concerning the physical variable or parameter at a given magnetic tape transport speed and playing back the recorded information, preferably at a faster tape transport speed, in response to an activating signal furnished by an overshot device. In accordance with this modification, the overshot device may be periodically lowered in the bore hole at any desired time rather than be positioned there during the entire drilling operation. Additional apparatus utilized in conducting a logging while drilling operation in accordance with this modification includes means in the sealed capsule for recording the electrical signal descriptive of the logging intelligence, means for playing back the logging intelligence signal through an electromagnetic circuit upon application of an instruction signal to the magnetic recording mechanism, and means associated with the overshot device for applying such instruction signal.

Other objects and a fuller understanding of the invention may be had by referring to the following description and claims, taken in conjunction with the accompanying drawings in which like parts are designated by like reference numerals and in which:

FIG. 1 illustrates an elevational view, partly in cross section of a bore hole containing a rotary drilling system including a preferred form of geophysical prospecting apparatus in accordance with the present invention mounted in the vicinity of the drill bit;

FIG. 2 illustrates an enlarged, side elevational view, partly in cross section of the upper end of the logging instrumentation housing and associated overshot device shown in FIG. 1;

FIG. 3 illustrates an electrical control and switching system for use in connection with the structure shown in FIG. 2;

FIG. 4 illustrates an enlarged, side elevational view, partly in cross section of another embodiment of the upper end of the logging instrumentation housing and for the overshot device shown in FIG. 2;

FIG. 5 illustrates an electrical control and switching system for use in connection with the structure shown in FIG. 4.

Figure 6:
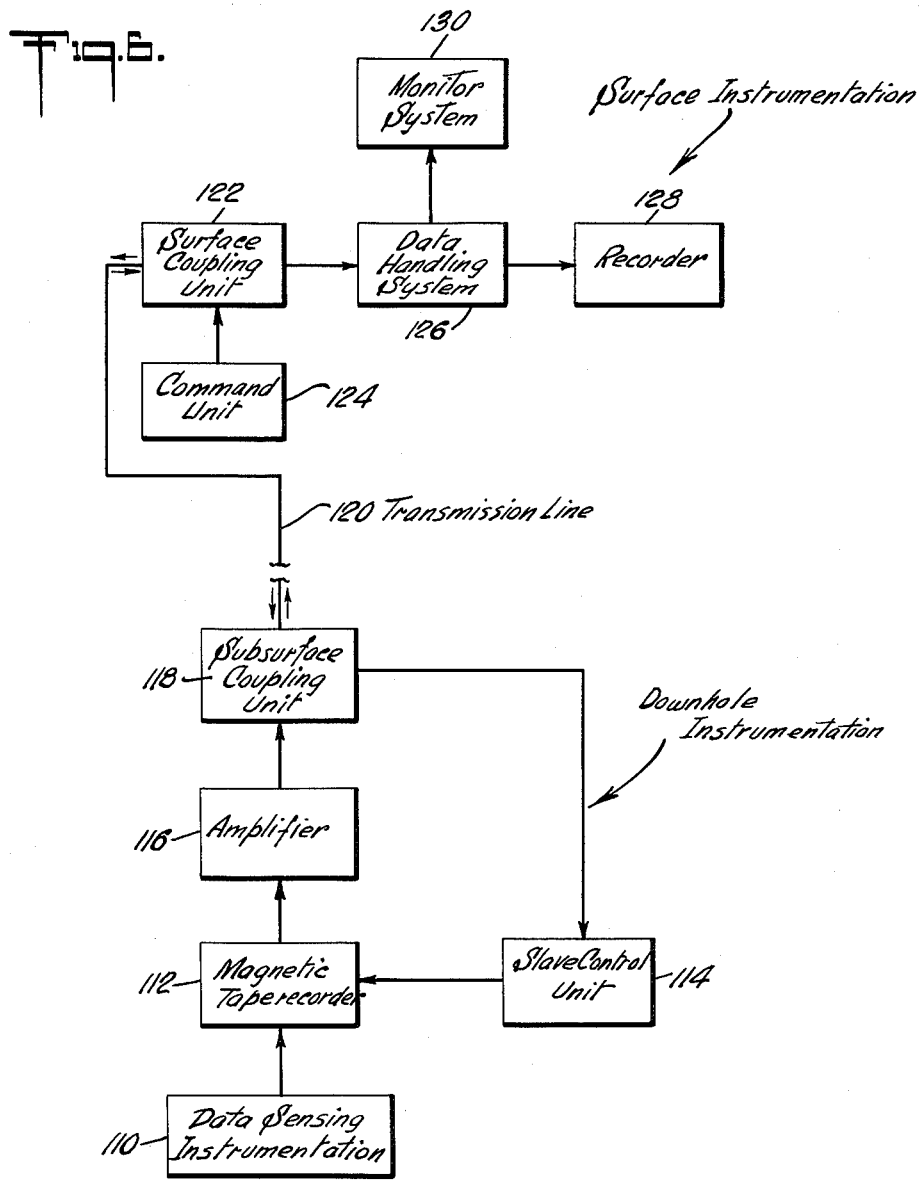
FIG. 6 illustrates in block diagram form component sections comprising an embodiment utilizing magnetic recording.

Referring to the drawings in more detail, there is shown in FIG. 1 a bore hole 8 traversing a plurality of earth formations 9 containing the lower portion of a drill stem or string 10 including a drill bit 12, a conventional sub 13 connected to bit 12, a tubular housing or pipe 14, a bottom adapter or connector sub 15 connecting conventional sub 13 to housing 14, a conventional drill collar 16, and a top adapter or connector sub 17 connecting housing 14 to drill collar 16. A sealed container or capsule 20 adapted to withstand pressures encountered in the drilling of the bore hole and which may be in the range of 14,000 pounds per square inch or higher is disposed coaxially within housing 14 and is rigidly secured thereto by bosses or studs 21. Capsule 20 comprises a hollow cylinder 22 and top and bottom caps 24 and 26 respectively. Within capsule 20 there is contained logging equipment, optionally including a magnetic recording and playback device and associated electronic circuitry 30, logging circuitry 32, comprising circuits and components for measuring the specific variable or parameter being logged, control unit 33 comprising appropriate switching mechanisms, as will be explained later with reference to FIG. 3 and FIG. 5, a power source 34 comprising a plurality of voltaic cells, and ring connector 35. In the embodiment shown in FIG. 4 imbedded in insulating material 68' in a groove 66' in top cap 24' is a coil 36' connected in the output circuit of magnetic recording and playback device 30', or in the event device 30' is not employed as will be explained later, coil 36' is connected in the output of logging circuitry 32'. At the surface of the earth there is shown a depth measuring device 37 in contact with drill string 10 for continuously recording the depth of drill bit 12 in bore hole 8 as a function of time and which device may be of a type similar to that disclosed in U.S. Patent 2,539,758. A substantial portion of outer housing 14 is covered with a layer of insulating material 38 in which may be imbedded electrical logging electrodes 28 and 29 in the event electrical characteristics of bore hole 8 are to be logged. These electrodes may be of the usual type of construction, such as a metallic conductor encircling sealed container 20 and electrically connected through slip ring connector 35 to logging circuitry 32. An overshot device 39 is shown suspended in bore hole 8 by means of conductor cable 40 running over pulley and cable measuring device 41, which is a part of the drawworks (not illustrated) used for lowering and raising overshot device 39. Overshot device 39, structural details of two types of which are shown in FIG. 2 and FIG. 4 is designed to fit over top cap 24 and contains an electrical coil for receiving the logging signal from coil 36 for transmission over cable 40 to surface logging electronics and recorder 42 and signal generator 43.

FIG. 2 illustrates an embodiment wherein logging information is passed directly from logging circuitry 32 to coil 36 for continuous transmission to the surface of the earth. Overshot device 39 is shown suspended from wireline 40 by means of cable anchor 63 in position for coil 64 to receive signals from coil 36 by electromagnetic induction. Coil 36 is wound around permeable iron core 80 located inside top cap 24 and receiving coil 64 is wound around iron core 82 located in overshot device 39. Since signal transmission between coil 36 and 64 is accomplished by electromagnetic induction, the presence of a material having magnetic susceptibility, such as iron or steel between cores 80 and 82 is undesirable in that such material interferes with the electromagnetic line of force. Therefore, in the embodiment of FIG. 2, top cap 24 and the lower portion of overshot device 39 enclosing core 64 are constructed of a non-magnetic material, preferably brass although other non-magnetic materials such as aluminum may be used, as well as high strength plastics such as Lucite or reinforced epoxy. The female portion of overshot member 39 fits over top cap 24 and is provided with relief port 70 to permit escape of drilling mud within the female portion as overshot member 39 is lowered into position over top cap 24. The input to preamplifier 72 located in the upper end of overshot member 39 is electrically connected by leads 74 to pickup coil 64 and its output is connected by leads 76 to wireline conductor cable 40.

Further in reference to FIG. 2, sealed capsule 20 is rigidly secured axially within tubular housing or pipe 16 by means of bosses or studs 21. Rotatable cylinder 23 contained within capsule 20 is supported at its top end by bearing 50 and at the lower end (not shown) by a similar bearing such that cylinder 23 is free to rotate about its axis within sealed capsule 20. Logging information concerning properties or parameters of the earth formations traversed by the instrument is passed from logging circuitry 32 to coil 36 by means of leads 56 connected through slip ring connector 58. Switch motor control unit 100, switch motor 102 and switch 104, shown collectively as control unit 33 in FIG. 1, serve to control the application of electrical energy from power supply 34 and thus control the off-on condition of logging circuitry 32, as will be explained more fully in relation to FIG. 3.

FIG. 3 illustrates in block diagram form an electrical control system for use in connection with the embodiment of FIG. 2. The signal source for logging circuitry 32 is a device for sensing variations in the parameter being measured. The output of logging circuitry 32 is connected to coil 36 and by the electromagnetic induction the logging signal is transmitted to coil 64 and thence over cable 40 to surface logging electronics and recorder 42. At the surface, signal generator 43 is also connected to cable 40 in a manner such that on command by the drilling operator coded D.C., or R.F. impulses if so desired, are transmitted to the subsurface equipment over cable 40. These impulses are transmitted by electromagnetic induction from coil 64 to coil 36 and then over wires 56 to switch motor control unit 100. Here the D.C. or R.F. impulses actuate switch motor control unit which in turn actuates switch motor 102 to control the position of off-on switch 104 in the circiut between logging circuitry 32 and power supply 34, thus turning logging circuitry 32 on and off as desired.

FIG. 4 illustrates an embodiment whereby logging information is recorded and stored on magnetic tape until playback is performed at a command signal from the surface of the earth. As in FIG. 2, overshot member 39' is shown suspended from wireline 40' by means of cable anchor 63' in position for coil 64' to receive signals from coil 36' by electromagnetic induction. Top portion 78' of overshot device 39' is solid metal except for conduit 77' through which leads 74' are passed to connect to cable 40'. The additional weight provided by solid metal top portion 78' facilitates lowering of overshot device 39' into position. Coil 36' is wound in groove 60' around the outside of top cap 24' and is embedded in a suitable insulating material 62'. Coil 64' is wound in groove 66' around the inner circumference of overshot device 39' and is embedded in insulating material 68'. Leads 74' connecting coil 64' to cable 40' are located in a slot 79' along the interior wall of overshot device 39'. The female portion of overshot device 39' fits over top cap 24' and is provided with relief port 70' to permit escape of well bore fluids within the female portion as overshot member 39' is lowered into position over top cap 24'.

In the lower portion of FIG. 4, sealed capsule 20' is rigidly mounted axially within tubular housing or pipe 16' by means of bosses or studs 21'. Rotatable cylinder 23' contained within capsule 20' is supported at its top end by bearing 50' and at the lower end (not shown) by a similar bearing such that cylinder 23' is free to rotate about its axis within sealed capsule 20'. While logging circuitry 32' located within cylinder 23' has been previously referred to as being of a type useful in conducting electrical logging, this invention is not restricted to such logging service and logging circuitry 32' merely indicates a source of an electrical signal suitable for recording on magnetic tape, whether the signal be derived from an electrical log (resistivity or spontaneous potential), radioactivity log (natural or induced), acoustic log (velocity or attenuation), temperature log (absolute or gradient), pressure log (absolute or differential), bit vibration data, or any other parameter which may be measured in a well bore from which a suitable signal may be derived for recording on magnetic tape.

In general, it is preferable that logging information recorded on magnetic tape be in the form of electrical pulses. In radioactivity logging operations wherein Geiger-Mueller type counters or scintillation detectors are employed for detection of the desired radiation, the output signal from such counters and detectors is obtained directly in the form of electrical pulses which either may be recorded on magnetic tape in their original form, or may be first passed to scaling circuits to reduce the number of pulses recorded. They may also, if desired, be passed to pulse shaping networks for conversion to square wave pulses prior to recording. Although a logging signal originally derived as a varying D.C. voltage, as for example in the case of electrical and acoustic logging, may be recorded directly, it is preferable that such signals be converted into a train of pulses, the repetitive frequency or amplitudes of which are a function of the amplitude of the original D.C. signal. A preferred method for transforming a signal which occurs as a varying D.C. voltage into a series of discrete electrical pulses which vary in repetitive frequency as a function of the amplitude of the unidirectional signal voltage is described in copending application Serial Number 166,232 filed January 15, 1962 in the name of Arthur H. Lord.

The output of logging circuitry 32' is connected to the input of magnetic recorder and playback device 30' by means of leads 52'. Power supply 34', also located in cylinder 23', furnishes electrical power for the operation of logging circuitry 32' and recorder 30', the application of electrical power to these elements being controlled by switch 104' which is operated by switch motor 102' and which in turn is actuated by switch motor control unit 100'. Further reference will be made to these elements in connection with FIG. 5. The output, or playback, from recorder 30' is connected to coil 36' by means of wire leads 54', slip ring connector 58' and leads 56' in sequence.

Referring now to FIG. 5, which illustrates in block diagram form an electrical control system for use in connection with the embodiment of FIG. 4, an electrical signal in a form suitable for magnetic recording, as previously discussed, and indicative of values of a parameter being measured is produced in logging circuitry 32' which is operated by power supply 34', preferably comprised of batteries. The off-on condition of logging circuitry 32' is controlled by means of control switch 104' located in the circuit connecting logging circuitry 32' to power supply 34'. The signal source for logging circuitry 32' is a device for sensing variations in the parameter being measured, which may be electrodes in the case of electrical logging, radiation detectors in the case of radioactivity logging, acoustic transducer elements in the case of acoustic logging, pressure or temperature sensing elements in the case of pressure or temperature logs, etc. The electronic circuits forming logging circuitry 32' may be any of the circuits disclosed in the prior art for handling the desired type of logging signal. The output of logging circuitry 32' is connected to the input of magnetic recorder 30' where the logging information is recorded on magnetic tape for subsequent playback. Electrical power for the operation of magnetic recorder 30' is supplied by power supply 34'.

The off-on record-playback conditions of magnetic recorder 30' are also controlled by control switch 104' located in the circuit connecting magnetic recorder 30' to power supply 34'. Tape transport speed during recording may be of the order of a few inches per minute and recording tape speeds ranging from 1.12 to 22.5 inches per minute have been found to be quite satisfactory.

Playback tape transport speeds from 10 to several hundred times the recording transport speed have been found to be quite satisfactory. Playback preferably is accomplished during a high-speed rewind cycle, in which case the information is transmitted to the surface in reverse order from that in which it was recorded. However, if desired, information may be played back in the same order in which it was recorded by employing a 4-step sequence of operations, for example, forward record, reverse high speed rewind, forward high speed playback, and reverse high speed rewind.

The output of magnetic recorder 30′ is cycled to coil 36′ by means of wire leads 58′ and information being played back is transmitted to coil 64′ by electromagnetic induction and thence over cable 40′ to surface logging electronics and recorder 42′ where the information is recorded in visible form, such as a strip chart.

Also connected to cable 40′ at the surface is signal generator 43′ in which command signals, either coded D.C. or R.F., are generated as desired by the drilling operator and are transmitted down-hole over cable 40′ and coils 64′ and 36′ to switch motor control unit 100′. The transmitted coded pulses actuate switch motor control unit 100′ which in turn operates switch motor 102′, which moves control switch 104′ to the desired positions for turning the subsurface equipment on or off and for controlling the operation of magnetic recorder 30′ to effect recording or playback, as well as rewind in case a 4-step sequence is employed as previously explained.

In FIG. 6 the component sections in block form of a system based on down-hole magnetic recording of logging data with provision for playback and transmission of the data to the surface upon a command initiated at the surface. In this embodiment, logging information for any desired parameter to be measured is detected in data sensing instrumentation 110 and translated into a form suitable for recording on magnetic tape. In general, the most suitable form is as electrical pulses as previously discussed. The logging information is then recorded in magnetic tape recorder 112, the operation of which is controlled by slave control unit 114. As previously explained in connection with FIGS. 4 and 5, recording and playback are controlled from the surface of the earth by means of electrical signals transmitted downhole to slave control unit 114. During playback of the recorded information the playback signals are amplified in downhole amplifier 116 and the amplified signals are transmitted to the surface of the earth by means of subsurface coupling unit 118 and transmission line 120. Subsurface coupling unit 118 may be of any form or design suitable for inductive or transformer coupling of the signals from amplifier 116 to transmission line 120. Two embodiments by means of which such transmission can be effected have been described in connection with FIGS. 2 and 4 but it is not intended that my invention be limited to the specific embodiments previously described. Rather it is contemplated that I may employ any design or type of structure which will accomplish the transfer of electrical energy by electromagnetic coupling or transformer action from the subsurface logging unit shown in FIG. 1 to a signal pickup and transmission device lowered separately into the bore hole, as exemplified by overshot device 39 of FIG. 1.

At the surface of the earth, the signals conducted over transmission line 120 are fed to surface coupling unit 122. By means of unit 122, command unit 124 and data handling system 126 are coupled to transmission line 120, making it possible to transmit over the same transmission line logging information from the downhole instrumentation to the surface data handling system 126 and command signals from surface command unit 124 to downhole slave control unit 114. Advantageously, surface coupling unit 122 comprises electromagnetic elements for inductive or transformer coupling.

Command unit 124 includes appropriate circuitry for generating electrical signals for controlling the operation of downhole magnetic tape recorder 112. Command signals generated in command unit 124 may be coded D.C. pulses or R.F. signals of specific frequencies which are impressed on transmission line 120 by means of surface coupling unit 122. Downhole, these signals are transmitted via subsurface coupling unit 118 to slave control unit 114, which in turn responds to the command signals and controls the operation of magnetic tape recorder 112 in accordance with the instructions transmitted to it in the command signals.

Data handling system 126 receives the logging information transmitted to the surface from the subsurface equipment and translates this information into a form suitable for recording as a function of the depth of the subsurface equipment in the well bore, thus providing a log of the earth formations traversed by the subsurface equipment. Monitor system 130 is also connected to data handling system 126 and provides for instantaneous visual inspection of the logging data received at the surface.

In employing the system described in the foregoing for making a log of earth formations traversed by a drill bit while the drilling operation is in progress, for the most part the drilling operation proceeds in an essentially normal manner. However, when the well bore being drilled reaches a depth at which it is desired to start obtaining information regarding the characteristics of the surrounding formations the logging while drilling apparatus of this invention is inserted between sub 13 and conventional drill collar 16 of the drill stem. Prior to final assembly the logging mechanism in sealed capsule 20 may be placed into operation by throwing an appropriate switch. However, in order to conserve batteries, it is preferable to activate the logging circuitry after the drill bit has reached the bottom of the well bore and drilling has started. This may be accomplished either by means of a timing mechanism, a centrifugal switch which activates the instrumentation when the drill bit is turning, both of which are known in the art, or the device may be activated by means of a suitable control signal applied from the surface of the earth to the logging device by means of overshot device 39. This signal may be either of a coded pulse type or may be an R.F. signal.

When the apparatus illustrated in FIGS. 2 and 3 is employed, logging information is transmitted continuously to the surface while the drilling operation is being conducted. With this arrangement it is necessary to lower overshot device 39 into the drill stem each time a stand of pipe is added to the drill string. Likewise, it is necessary to raise overshot device 39 to the surface prior to adding another stand of pipe. The advantage of this arrangement is that logging information is transmitted to the surface continuously while drilling is taking place and zones of interest can be detected immediately upon being traversed by the drill bit. An activating signal generated in signal generator 43 operates switch motor control unit 100 and switch motor 102 in the downhole device to move switch 104 from one position to another. With this arrangement, the only function of switch 104 is to turn the logging circuitry on and off. Thus, when overshot device 39 is located in place over the top cap 24 an impulse from the surface starts the logging operation and information is transmitted to the surface over cable 40 until a second impulse from the surface turns the logging equipment off. Overshot device 39 is then pulled up the drill stem to the surface to permit another stand of pipe to be added to the drill string. A continuous strip chart log of the formations is recorded on surface recorder 42 as drilling progresses. This information is correlated with time-depth recorder 41 to obtain a depth log of the well bore.

In another method of conducting a logging operation in accordance with the subject invention utilizing the apparatus of FIGS. 4 and 5, logging information is recorded on magnetic tape and at periodic intervals is played back and transmitted to the surface upon application of a playback control signal to the logging instrument. In this method it is not necessary to lower the overshot device into the well bore prior to the time transmission of the logging information is desired. Under these circumstances, it is preferable either to activate the logging circuitry at the surface before it is lowered into the well bore, or by a timing mechanism set to activate the logging circuitry at approximately the time the bit reaches bottom, or to cause it to be activated by rotation of the drill bit as previously mentioned.

After drilling has progressed for a period of time and it is desired to transmit the logging record to the surface, overshot device 39' is lowered into well bore 8 through drill stem 10. This is accomplished by removing the kelley at the top of the drill stem and lowering overshot device 39' through drill stem 10 by means of suitable drawworks located at the surface. Obviously, overshot device 39' must have sufficient mass to descend through the drilling mud in the drill string at a reasonable rate of speed. When overshot device 39' has been lowered until it rests on top of sealed capsule 20' such that coil 36' is opposite coil 64' a suitable coded pulse or an R.F. signal of specified frequency is transmitted from signal generator 43' at the surface to the bore hole instrumentation in order to stop the recording mechanism in capsule 20' and initiate information playback by means of a system such as that shown in FIG. 5. Playback is performed at a faster tape speed than is used during recording in order to reduce down time of the drilling rig while this operation is being conducted. Advantageously, the playback speed may be as much as from ten to several hundred times the recording speed.

Referring further to FIG. 5, when an activating signal produced in generator 43' is transmitted by means of cable 40' to coil 64' and thence by electromagnetic induction coil 36', the applied signal actuates switch motor control unit 100' which in turn operates switch motor 102 controlling switch 104' which in turn controls the operation of the magnetic recorder 30'. Thus, when the instrument is logging and switch 104' is in the record position, a signal or impulse from the surface will cause switch 104' to move to the second or rewind position. With switch 104' in this position, the direction of the magnetic tape in the magnetic tape recorder is reversed and the tape is transported in the opposite direction at a higher rate of speed as mentioned previously. During this reverse movement of the tape, information is played back from magnetic recorder 30' to coil 36' and by electromagnetic induction to coil 64' from whence it is transmitted over cable 40' to surface electronics and recording equipment 49'. Here the information is recorded on a typical strip chart or other suitable recording media in correlation with time. In order to obtain a record in which the ordinate is well bore depth rather than time, it is necessary to further correlate the strip chart record with the time-depth device record produced on time-depth indicator 41.

As an alternative, magnetic recorder 30' may be provided with a high speed rewind and a high speed direct wind playback in order to transmit the logging record to the surface in the same time sequence as it was recorded. This results in some simplification of the surface electronics but increases the time required for transmission of information to the surface. In such event, switch 104' is provided with additional contacts to control magnetic recorder 30' through "record"—"high speed rewind"—"high speed playback"—"high speed rewind"—and "off" positions. Switch 104' is rotated through each of these positions by a control impulse from signal generator 43' at the surface.

Obviously, many modifications and variations of the invention as hereinbefore set forth may be made without departing from the spirit and scope thereof and therefore only such limitations should be imposed as are indicated in the appended claims.

I claim:

1. Apparatus for simultaneously drilling and logging a well bore penetrating earth formations comprising a sealed housing mounted inside a drill string on the longitudinal axis thereof, instrumentation means disposed within said housing for continuously receiving indications of values of a physical characteristic, and means adapted to be lowered separately into said well bore for transmitting logging intelligence from said instrumentation means to the surface of the earth, said instrumentation means including magnetic recording means for recording intelligence in the form of electrical signals at a relatively slow tape transport speed and subsequently playing back said intelligence at a relatively faster tape transport speed.

2. Apparatus for simultaneously drilling and logging a well bore penetrating earth formations comprising a sealed housing mounted inside a drill string on the longitudinal axis thereof, said housing having an extended portion of reduced cross section at the uppermost end thereof, instrumentation means rotatably disposed within said housing for continuously receiving and storing indications of values of a physical characteristic, said instrumentation means including magnetic recording means for recording intelligence in the form of electrical signals at a relatively slow tape transport speed and subsequently playing back said intelligence at a relatively faster tape transport speed and signal sensing means adapted to be lowered separately into said well bore for sensing and transmitting said indications from said instrumentation means to the surface of the earth, said signal sensing means being adapted to fit over said reduced portion of said housing, and coupling means located in said housing and said signal sensing means to provide for transmission of intelligence from said instrumentation means to said signal sensing means.

3. Apparatus for simultaneously drilling and logging a well bore penetrating earth formations comprising a sealed housing mounted inside a drill string along the longitudinal axis thereof, said housing having an extended portion of reduced cross section at the uppermost end thereof, said extended portion being comprised of non-magnetic material, instrumentation means rotatably disposed within said housing for receiving indications in the form of electrical signals corresponding to values of a physical characteristic, said instrumentation means including magnetic recording means for recording intelligence in the form of electrical signals at a relatively slow tape transport speed and subsequently playing back said intelligence at a relatively faster tape transport speed, a first magnet core positioned in said extended portion of said housing, a transmission coil wound around said first magnet core and connected in the output circuit of said instrumentation means, a bell shaped signal sensing device adapted to be lowered separately into said well bore and being adapted to fit over the upper portion of said sealed housing when lowered into said well bore, said signal sensing device having a cylindrical nonmagnetic inner wall and a cylindrical outer wall, said inner and outer walls being separated by an annular space, a second magnet core positioned in said annular space, a receiving coil wound around said second magnet core, said core and said receiving coil being positioned such that electromagnetic coupling is achieved between said transmission coil and said receiving coil winding when said signal sensing device is lowered into place over the upper end of said sealed housing, signal transmission means connected to said receiving coil and extending to the surface of the earth, and signal handling means connected to said transmission means at the surface of the earth for recording logging information received from said instrumentation means.

4. Apparatus for simultaneously drilling and logging a well bore penetrating earth formations comprising a drill string having a drill collar affixed to the lower end thereof, a sealed housing mounted inside said drill collar along the longitudinal axis thereof with an annular space between said housing and said drill collar and said housing having an extended portion of reduced cross-section at the uppermost end thereof, instrumentation means disposed within said housing for receiving and storing electrical signals derived as indications of valves of a physical characteristic while drilling is in progress, said instrumentation means including magnetic recording means having a relatively slow tape transport recording speed and relatively high tape transport rewind and playback speeds, electrical signal sensing as an electrical signal, and means adapted to be lowered separately into said well bore for activating said magnetic recording means to rewind and to play back said recorded electrical signals at a higher tape transport speed than the transport speed used for recording said signals and for sensing and transmitting said electrical signal from said instrumentation means in said housing to the surface of the earth, said electrical signal sensing means being adapted to fit over said reduced portion of said housing, and inductive coupling means located in said housing and said electrical signal sensing means to provide for transmission of intelligence from said instrumentation means to said signal sensing means.

5. Apparatus for simultaneously drilling and logging a well bore penetrating earth formations comprising a drill string having a drill collar affixed to the lower end thereof, a sealed housing mounted said drill collar along the longitudinal axis thereof with an annular space between said housing and said drill collar and said housing having an extended portion of reduced cross-section at the uppermost end thereof, instrumentation means disposed in said housing for receiving and storing electrical signals derived as an indication of values of a parameter being measured, while said drill string is rotating, said instrumentation means including magnetic recording means having a relatively slow tape transport recording speed and a relatively high tape transport rewind speed with means for signal playback during the rewind operation, electrical signal sensing means adapted to be lowered through the drill string for activating said magnetic recording means to concurrently rewind said magnetic tape and play back said recorded electrical signals at a higher tape transport speed than the transport speed used for recording said signals and for sensing and transmitting said electrical playback signal from said instrumentation means in said housing to the surface of the ground said electrical sensing means being adapted to fit over said reduced portion of said housing, and inductive coupling means located in said housing and said electrical signal sensing means to provide for transmission of intelligence from said instrumentation means to said signal sensing means.

6. Apparatus for simultaneously drilling and logging a well bore penetrating earth formations comprising a drill string having a drill collar affixed to the lower end thereof, a sealed housing mounted inside said drill collar along the longitudinal axis thereof with an annular space between said housing and said drill collar and said housing having an extended portion of reduced cross section at the uppermost end thereof, instrumentation means disposed within said housing for continuously receiving and storing electrical signals derived as indications of values of a physical characteristic being measured while said drill string is rotating said instrumentation means including magnetic recording means having a multiplicity of tape transport speeds, electrical signal sensing means adapted to be lowered into said well bore for activating said magnetic recording means to playback said recorded electrical signals at a higher tape transport speed than the transport speed used for recording said signals and for sensing and transmitting said electrical playback signals from said instrumentation means in said housing to the surface of the earth, said electrical signal sensing means being adapted to fit over said reduced portion of said housing, and inductive coupling means located in said housing and said electrical signal sensing means to provide for transmission of intelligence from said instrumentation means to said signal sensing means.

7. In the method of logging a well bore penetrating the earth wherein logging instrumentation is contained in a sealed housing positioned in the drill string in proximity to the drill bit and an electrical intelligence signal indicative of values of a physical characteristic is magnetically recorded at a given tape transport speed while the drill string is rotating, the improvement comprising ceasing the recording when the drilling operation is suspended, playing back at a substantially faster tape transport speed the magnetically recorded electrical intelligence signal through an inductive circuit in response to an externally applied playback signal, detecting said electrical intelligence signal with an inductive circuit lowered through the drill string and positioned adjacent said housing, transmitting said detected signal to the surface of the earth over an electrical conductor, and recording said transmitted signal as a log of said well bore.

8. In the method of logging a well bore penetrating the earth wherein logging instrumentation is contained in a sealed housing positioned in the drill string in proximity to the drill bit and an electrical intelligence signal indicative of values of a physical characteristic is magnetically recorded at a given tape transport speed only while the drill string is rotating, the improvement comprising lowering a signal sensing device through the drill string into close proximity to said housing, applying an activating signal to the instrumentation in said housing by means of said sensing device to cause playback at a substantially faster tape transport speed of the electrical intelligence signal magnetically recorded during drill string rotation, detecting said electrical intelligence signal with a pickup circuit located in said sensing device, amplifying and transmitting said detected signal to the surface of the earth over an electrical conductor, and recording said transmitted signal as a log of said well bore.

References Cited by the Examiner

UNITED STATES PATENTS

| | | | |
|---|---|---|---|
| 2,370,818 | 3/45 | Silverman | 340—18 X |
| 2,389,241 | 11/45 | Silverman | 340—18 |
| 2,677,790 | 5/54 | Arps. | |
| 2,776,563 | 1/57 | Holbert | 336—119 X |
| 3,090,031 | 5/63 | Lord | 340—18 |

SAMUEL FEINBERG, *Primary Examiner.*

CHESTER L. JUSTUS, *Examiner.*

UNITED STATES PATENT OFFICE
CERTIFICATE OF CORRECTION

Patent No. 3,209,323                  September 28, 1965

George J. Grossman, Jr.

It is hereby certified that error appears in the above numbered patent requiring correction and that the said Letters Patent should read as corrected below.

Column 11, line 8, for "valves" read -- values --.

Signed and sealed this 5th day of April 1966.

(SEAL)
Attest:

ERNEST W. SWIDER                   EDWARD J. BRENNER
Attesting Officer                    Commissioner of Patents